(12) United States Patent
Gering et al.

(10) Patent No.: US 12,204,094 B2
(45) Date of Patent: Jan. 21, 2025

(54) METHOD FOR OPERATING A MEMS SYSTEM, AND MEMS SYSTEM

(71) Applicant: Robert Bosch GmbH, Stuttgart (DE)

(72) Inventors: Stefan Gering, Weissach (DE); Andreas Petersen, Eningen (DE); Florian Schuster, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 863 days.

(21) Appl. No.: 17/293,744

(22) PCT Filed: Jan. 11, 2020

(86) PCT No.: PCT/EP2020/050615
§ 371 (c)(1),
(2) Date: May 13, 2021

(87) PCT Pub. No.: WO2020/169264
PCT Pub. Date: Aug. 27, 2020

(65) Prior Publication Data
US 2022/0003986 A1 Jan. 6, 2022

(30) Foreign Application Priority Data
Feb. 21, 2019 (DE) .......................... 102019202331.2

(51) Int. Cl.
*H04N 9/31* (2006.01)
*G02B 26/08* (2006.01)
(Continued)

(52) U.S. Cl.
CPC ....... *G02B 26/101* (2013.01); *G02B 26/0833* (2013.01); *G09G 3/002* (2013.01);
(Continued)

(58) Field of Classification Search
CPC .. G02B 26/101; G02B 26/0833; G09G 3/025; G09G 3/346; G09G 3/002; H04N 9/3135; H04N 9/3194
See application file for complete search history.

(56) References Cited

U.S. PATENT DOCUMENTS

| 2010/0073748 A1 | 3/2010 | Holmes et al. |
| 2012/0170639 A1 | 7/2012 | Salisbury |

(Continued)

FOREIGN PATENT DOCUMENTS

| DE | 102013217105 A1 | 3/2015 |
| EP | 2711916 A1 | 3/2014 |

OTHER PUBLICATIONS

International Search Report for PCT/EP2020/050615, Issued Apr. 22, 2020.

(Continued)

*Primary Examiner* — Adam R. Giesy
(74) *Attorney, Agent, or Firm* — NORTON ROSE FULBRIGHT US LLP; Gerard A. Messina

(57) ABSTRACT

A method for operating a MEMS system having a projection unit for providing an image via a light beam, and a deflecting unit for the two-dimensional deflection of the at least one light beam. The method includes: driving the deflecting unit via a reference signal, so that the deflecting unit periodically deflects a light beam at least two-dimensionally, measuring a controlled variable of the deflecting unit that corresponds to an actual position of the deflected light beam, ascertaining a current deviation of the controlled variable from a target variable that corresponds to a target position of the light beam, calculating a compensating variable based on the ascertained deviation, controlling the deflecting unit and/or controlling the projection unit based on the calculated compensating variable for reducing the deviation of the light (Continued)

beam from the target position. The compensating variable is additionally calculated based on an earlier deviation in an earlier period.

14 Claims, 2 Drawing Sheets

(51) Int. Cl.
*G02B 26/10* (2006.01)
*G09G 3/00* (2006.01)
*G09G 3/02* (2006.01)
*G09G 3/34* (2006.01)

(52) U.S. Cl.
CPC ............. *G09G 3/025* (2013.01); *G09G 3/346* (2013.01); *H04N 9/3135* (2013.01); *H04N 9/3194* (2013.01)

(56) References Cited

U.S. PATENT DOCUMENTS

| | | |
|---|---|---|
| 2015/0237316 A1 | 8/2015 | Viswanathan et al. |
| 2015/0249809 A1 | 9/2015 | Lin et al. |
| 2020/0264426 A1* | 8/2020 | Matsui ................. G02B 26/101 |

OTHER PUBLICATIONS

Gi Sang Choi et al., "A Study on Position Control of Piezoelectric Actuators," Industrial Electronics, ISIE '97, Proceedings of the IEEE Inter National Symposium On Guimaraes, 1997, pp. 851-855.
Anonymous, "Regelkreis," 2018, Wikipedia, pp. 1-32. <https://de.wikipedia.org/w/index.php?title=Regelkreis&oldid=I82111566>.

\* cited by examiner

METHOD FOR OPERATING A MEMS SYSTEM, AND MEMS SYSTEM

FIELD

The present invention relates to a method for operating a MEMS system having at least one projection unit for providing an image via at least one light beam, and having a deflecting unit for the two-dimensional deflection of the at least one light beam.

In addition, the present invention relates to a MEMS system including a projection unit for providing an image via at least one light beam and a deflecting unit that is designed to two-dimensionally deflect a light beam incident on the deflecting unit.

BACKGROUND INFORMATION

Although the present invention is generally applicable to any projection units, the present invention is described with reference to projection units in the form of lasers.

Although the present invention is generally applicable to any deflecting units, the present invention is explained with reference to deflecting units in the form of micromirrors.

U.S. Patent Application Publication No. US 2015/0249809 A1 describes a system for controlling or correcting a projected image that has an undesirable convex curvature in its lateral edge region. The image projection system includes a laser module and micromirror module having a periodically driven 2-DOF micromirror that can be tilted in two directions running orthogonal to one another. The controlling system includes the image projection system and a controller. The controller carries out a pulse-width modulation of the adjusting signal for correcting the angle of deflection of the micromirror.

European Patent Application No. EP 2 711 916 A1 describes a system for controlling or correcting a projected image that has a trapezoidal distortion of the image. The image projection system includes three lasers whose light is combined by dichroic mirrors, and a periodically driven 2-DOF micromirror that can be tilted in two directions running orthogonal to one another. The controlling system includes the image projection system, a controller for controlling the color or intensity of the laser light, and a controller for controlling the mirror orientation. The controlling system corrects a trapezoidal distortion.

SUMMARY

In a specific example embodiment, the present invention provides a method for operating a MEMS system having at least one projection unit for providing an image via at least one light beam and a deflecting unit for the two-dimensional deflection of the at least one light beam, including the steps:
  driving the deflecting unit via at least one reference signal, so that the deflecting unit periodically deflects a light beam at least two-dimensionally,
  measuring at least one controlled variable of the deflecting unit that corresponds to an actual position of the deflected light beam,
  ascertaining a current deviation of the at least one controlled variable from a target variable that corresponds to a target position of the light beam,
  calculating at least one compensating variable based on the ascertained deviation,
  controlling the deflecting unit with regard to the deflection, and/or controlling the projection unit with regard to the image provision based on the calculated at least one compensating variable for reducing the deviation of the light beam from the target position, such that in order to control the deflecting unit the at least one compensating variable is additionally calculated on the basis of an earlier deviation in at least one earlier period.

In a further specific example embodiment, the present invention provides a MEMS system including
  a projection unit for providing an image via at least one light beam,
  a deflecting unit that is designed to two-dimensionally deflect a light beam incident on the deflecting unit on the basis of at least one reference signal,
  a measuring unit for measuring at least one controlled variable of the deflecting unit that corresponds to an actual position of the deflected light beam,
  a deviation measuring unit designed to ascertain a current deviation of the at least one controlled variable from a target variable that corresponds to a target position of the light beam,
  a predictor unit designed to calculate at least one compensating variable based on the ascertained deviation, and
  a controlling unit designed to control the deflecting unit with regard to the deflection and/or to control the projection device with regard to the image provision, based on the calculated at least one compensating variable for reducing the deviation of the light beam from the target position, in which, in order to control the deflecting unit, the at least one compensating variable is additionally calculated by the predictor unit on the basis of an earlier deviation in at least one earlier period.

One of the advantages thereby achieved may be that in this way, in a simple and reliable manner, deviations between a reference position or target position of a projected image point and the actual projected position of the image point are minimized by the deflecting unit. A further advantage is that robustness against disturbing influences on the deflecting unit or the projection unit can be increased. A further advantage is the compensation of dead times that result for example from an analog-digital or digital-analog conversion. In addition, an advantage is that in the controlling of the deflecting unit, previous knowledge of earlier deviations is used to carry out a current controlling of the deflecting unit, which improves the overall performance of the MEMS system. Using this previous knowledge, an almost temporally perfect agreement is possible between the reference position or target position of the projected image point and the position of the image point actually provided by the deflecting unit.

In other words, separately either a) the deflecting unit is controlled with regard to the deflection based on the calculated at least one compensating variable for the reduction of the deviation of the light beam from the target position, or b) the projection unit is controlled with regard to the image provision based on the calculated at least one compensating variable for the reduction of the deviation of the light beam from the target position. In addition, both a) the deflecting unit can be controlled with regard to the deflection and b) the projection unit can be controlled with regard to the image provision based on the calculated at least one compensating variable for the reduction of the deviation of the light beam from the target position.

Further features, advantages, and additional specific embodiments of the present invention are described in the following, or are made obvious thereby.

According to an advantageous development of the present invention, the at least one reference signal is provided in the form of a periodic, preferably wave-shaped, bandwidth-limited signal. An advantage of this may be that in this way, in a simple and reliable manner, a periodic controlling is enabled of the deflecting unit, and thus a periodic deflection is enabled of the light beam incident on the deflecting unit.

According to a further advantageous development of the present invention, the at least one compensating variable is calculated within a predetermined frequency control interval, the at least one reference signal being provided from at least one fundamental harmonic of a sawtooth signal, the at least one fundamental harmonic being provided within the frequency control interval. An advantage of this may be that within the frequency control interval deviations from the reference signal caused by the deflecting unit can be controlled out in a simple and reliable manner. A fundamental harmonic is to be understood in particular as the fundamental oscillation having a frequency f, or an oscillation having a whole-number multiple of the frequency f. A sawtooth signal can for example be represented by a fundamental oscillation and infinitely many overtones, i.e., whole-number multiples of the frequency of the fundamental oscillation.

According to a further advantageous development of the present invention, the calculation of the at least one compensating variable is done using a predictor, in particular a Smith predictor. In this way, controlling errors of the deflecting unit can be compensated dynamically in a simple and fast manner. An advantage of a Smith predictor is a compensation of controlling errors that result from neglecting dead times, for example of a digital-analog conversion of a controlling signal for the deflecting unit.

According to a further advantageous development of the present invention, an adaptation unit is used to adapt the brightness of the deflected light beam as a function of its actual position. In this way, a projected image is represented still more reliably by the MEMS system.

According to a further advantageous development of the present invention, the light beam is deflected with different speeds by the deflecting unit at least two-dimensionally, via deflection about at least two different axes. This increases the flexibility in the representation of the image using the deflecting unit. According to a further advantageous development of the present invention, the driving of the deflecting unit is done using two reference signals, the two reference signals having different frequencies, and a deflection by the deflecting unit taking place in such a way that using the first of the two reference signals a deflection takes place about the one of the two different axes, and using the second of the two reference signals a deflection about the second of the two different axes takes place. This increases the flexibility with regard to the representation of the projected image.

According to a further advantageous development of the MEMS system of the present invention, the deflecting unit includes a MEMS mirror that is movable about at least two axes, or includes at least two MEMS mirrors, each movable about a respective axis, the at least two axes having different orientations. An advantage of this is that, in a simple and reliable manner, a deflection of a light beam in two dimensions can be provided.

According to a further advantageous development of the MEMS system of the present invention, the controlling unit has an integrator and an anti-windup unit. An advantage of this is that in this way the integrator in the controlling unit is limited if controlled variables for the deflecting unit are to be defined outside the corresponding limits.

An anti-windup unit thus is generally used to limit one or more integrators of a linear controller in the case in which controlled variables of the controller are calculated, or requested, outside specified limits.

According to a further advantageous development of the MEMS system of the present invention, the predictor unit is designed to carry out the calculation on the basis of a Smith predictor. An advantage of a Smith predictor is a compensation of controlling errors that result from neglecting the dead time.

According to a further advantageous development of the MEMS system of the present invention, the controlling unit has a closed linear control loop for controlling at least one of the axes of the deflecting unit. This enables a simple and at the same time reliable controlling of the deflecting unit in a continuous control interval that is as large as possible.

Further features and advantages of the present invention result from the Figures, and the associated description of the Figures.

Of course, the features described above and explained in the following may be used not only in the respectively indicated combination, but also in other combinations or by themselves, without departing from the scope of the present invention.

Preferred embodiments and specific embodiments of the present invention are shown in the Figures and are explained in more detail in the following description, in which identical reference characters designate identical or similar or functionally identical components or elements.

DETAILED DESCRIPTION OF EXAMPLE EMBODIMENTS

Figure 1:
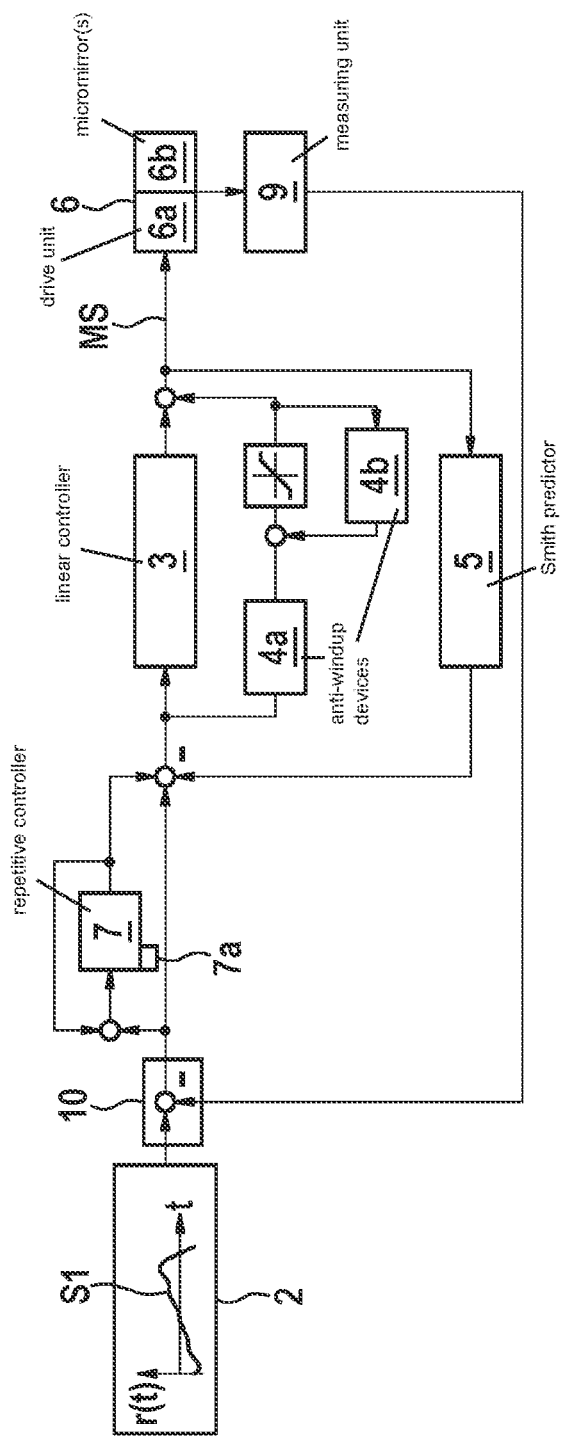
FIG. 1 schematically shows a MEMS system according to a specific example embodiment of the present invention.

FIG. 1 shows, in schematic form, a MEMS system according to a specific example embodiment of the present invention.

In detail, FIG. 1 shows a MEMS system 1. MEMS system 1 includes a reference generator 2 that produces a reference signal S1. In addition, MEMS system 1 includes a linear controller 3 that produces a control signal MS for controlling a deflecting unit 6. Control signal MS for deflecting unit 6 is transmitted to this unit. Deflecting unit 6 includes, for the deflecting of a light beam incident on deflecting unit 6, a drive unit 6a for one or more micromirrors 6b each of which is movable about a respective axis or about two axes, and that are then in particular periodically moved corresponding to control signal MS in order to correspondingly deflect a light beam.

In addition, a measuring unit 9 that measures a position of micromirror or micromirrors 6b is connected to deflecting unit 6. On the basis of the measured position, using a deviation measuring unit 10 a current deviation of a controlled variable of deflecting unit 6 (i.e., here the controlled variable for controlling the position of micromirror 6b) from a specified target variable is ascertained on the basis of reference signal S1. This deviation is then in turn transmitted to both a repetitive controller 7 and to linear controller 3.

In addition, MEMS system 1 includes two anti-windup devices 4a, 4b that are configured parallel to linear controller 3. In addition, a Smith predictor 5 is configured parallel to the input and output of linear controller 3. Linear controller 3 is used for the controlling and stabilization of micromirror 6b in a continuous frequency controlling band, or controlling range, that is as large as possible. Here, linear controller 3 is first correspondingly configured neglecting the dead time of the controlled system of MEMS system 1. MEMS system 1 shown in FIG. 1 has a control path that includes the movable axis or axes of micromirror 6b, measuring unit 9 for determining position, and (not shown in FIG. 1) an analog-digital/digital-analog converter, including analog filters. Smith predictor 5 is used in turn for the dynamic compensation of controlling errors that result from the neglecting of the dead time. Anti-windup devices 4a, 4b are used in turn to limit integrators of linear controller 3 in the case in which controlled variables for deflecting unit 6 are calculated or requested outside specified limits. In addition, using repetitive controller 7, occurrent controlling errors are compensated periodically, i.e., over at least one preceding period.

Reference signal S1 provided by reference generator 2 is, in FIG. 1, a wave-shaped, bandwidth-limited signal. Using signal S1, the image point of an image provided by a projection device (not shown here) is then projected with different speeds for the different axes of micromirror 6b. As a result, it is necessary to adapt or subsequently control the brightness of the image point. The wave-shaped, bandwidth-limited reference signal S1 can here be limited to a few, for example five, fundamental harmonic frequencies of a base signal, for example a rectangular or sinusoidal signal, with which an excitation of deflecting unit 6, in particular of micromirror 6b, is to take place. In this way, a reliable controlling out of deviations is enabled. In particular, reference signal S1 can be made up of finitely many fundamental harmonics of a sawtooth signal. The fundamental harmonics can be selected such that they lie within the controlling range, or control interval, of linear controller 3. Using repetitive controller 7, a compensation is achieved of dead times that result from the analog-digital conversion. For this purpose, repetitive controller 7 has a storage device 7a in which the controlling error is stored over at least one excitation period of the reference signal, or of micromirror 6b, from which future controlling errors and corresponding controlled variables can be derived. Periodic disturbances can in this way be efficiently controlled out, even if for example mirror resonance frequencies of micromirror 11 change.

Figure 2:
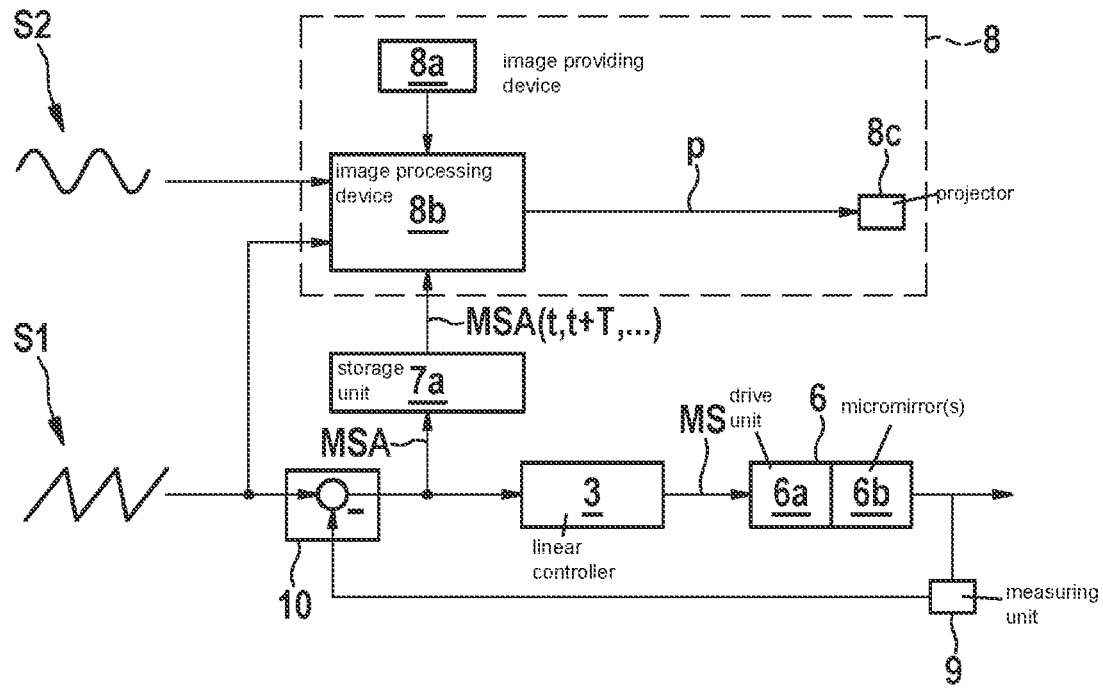
FIG. 2 schematically shows a MEMS system according to a specific example embodiment of the present invention.

FIG. 2 shows a MEMS system according to a specific example embodiment of the present invention.

FIG. 2 shows a MEMS system 1 having a linear controller 3 and a deflecting unit 6. A sawtooth-shaped periodic reference signal S1 is supplied to linear controller 3, which then provides a corresponding periodic adjusting signal MS for deflecting unit 6. Based on the measured controlled variable of deflecting unit 6, via a measuring unit 9 and a corresponding deviation measuring unit 10, linear controller 3 then controls deflecting unit 6 on the basis of the comparison with periodic reference signal S1, and produces the corresponding periodic adjusting signal MS for deflecting unit 6.

The overall deviation MSA is stored in a storage unit 7a. Storage unit 7a stores not only the current deviation of the current period of reference signal S1, but also the deviation over at least one earlier period. Storage unit 7a provides this information to an image processing device 8b of a projection device 8 that includes an image providing device 8a for providing an image. Image processing device 8b receives as information, on the one hand, for example a sinusoidal high-frequency signal S2 on one axis, and receives signal S1 on the other axis. Image processing device 8b now ascertains a two-dimensional image having a corresponding pixel function p for each pixel to be projected, taking into account the deviation, and forms the pixel function p via a projector 8c for the projection of the image. In other words, image processing device 8b takes into account not only the two reference signals S1, S2 for representing the image, but also takes into account the measured deviations MSA at at least one different point in time. Here, controlling errors of a deflecting unit 6, in particular of a micromirror 6b, which are periodic in a certain time window, are used to correct projected image contents so that a consistency is enabled between the controlling of deflecting unit 6, in particular a micromirror position, and the image contents to be projected, even if controlling errors continuously change.

As stated above, reference signals S1, S2 are used to control deflecting unit 6 about different axes. The movement of micromirror 6b of deflecting unit 6 can take place with different speeds about different axes, corresponding to different periods of the respective reference signal S1, S2. Image processing device 8b in turn uses these signals S1, S2 to determine that pixel in the image to be projected that is to be represented at a particular time by projector 8c of projection device 8. Storage unit 7a is fashioned in particular as a ring memory, preferably for the "lower" axis, which stores, over a period, the measured deviation between a reference position of micromirror 6b of deflecting unit 6 and the actual position of micromirror 6b. Under the assumption that this deviation between two temporally successive periods is equal, this deviation is used to correct reference signal S2 of image processing device 8b, and thus of the image to be projected.

In addition, the method described in relation to FIG. 1 and the method described in relation to FIG. 2 can be combined with one another, which further improves the precision of the controlling of deflecting unit 6 and of image processing unit 8b. Storage unit 7a can be used here both by repetitive controller 7 and by image processing device 8b.

Figure 3:
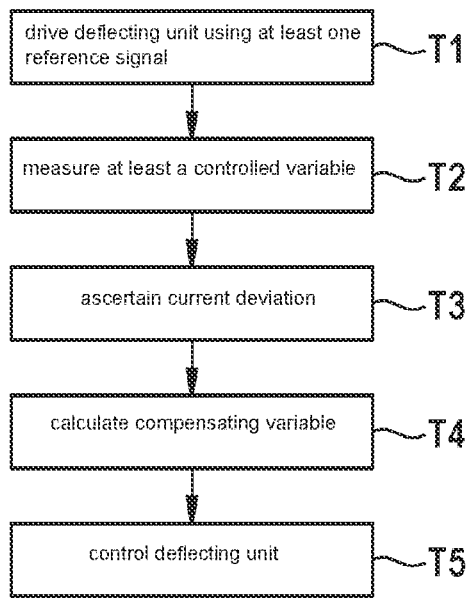
FIG. 3 schematically shows a method for operating a MEMS system according to a specific example embodiment of the present invention.

FIG. 3 schematically shows a method according to a specific example embodiment of the present invention.

In detail, FIG. 3 shows a method for operating a MEMS system having at least one projection unit for providing an image via at least one light beam, and a deflecting unit for the two-dimensional deflection of the at least one light beam.

The method includes the following steps:

In a step T1, there takes place a driving of the deflecting unit using at least one reference signal, so that the deflecting unit periodically deflects a light beam at least two-dimensionally.

In a further step T2, there takes place a measurement of at least a controlled variable of the deflecting unit that corresponds to a position of the deflected light beam.

In a further step T3 there takes place an ascertaining of a current deviation of the at least one controlled variable from a target variable that corresponds to a target position of the light beam.

In a further step T4 there takes place a calculation of at least one compensating variable based on the ascertained deviation.

In a further step T5, there takes place a controlling of the deflecting unit with regard to the deflection and/or of the projection unit with regard to the image provision, based on the calculated at least one compensating variable for reducing the deviation of the light beam from the target position, the at least one compensating variable being additionally calculated on the basis of an earlier deviation in at least one earlier period, for the controlling of the deflecting unit.

In sum, at least one of the specific embodiments of the present invention has at least one of the following advantages:
controlling over a large controlling range
higher precision in the representation of images
greater flexibility
compensation of dead times Although the present invention has been described on the basis of preferred exemplary embodiments, it is not limited thereto, but can be modified in many ways.

What is claimed is:

1. A method for operating a MEMS system having at least one projection unit configured to provide an image via at least one light beam, and a deflection unit configured to at least two-dimensionally deflect the at least one light beam, the method comprising the following steps:
    driving the deflecting unit using at least one reference signal, so that the deflecting unit periodically deflects the at least one light beam at least two-dimensionally;
    measuring at least one controlled variable of the deflecting unit that corresponds to an actual position of the deflected light beam;
    ascertaining a current deviation of the at least one controlled variable from a target variable that corresponds to a target position of the light beam;
    calculating at least one compensating variable based on the ascertained deviation; and
    controlling the deflecting unit with regard to the deflection and/or controlling the projection unit with regard to the image provision, wherein the controlling of the deflecting unit and/or the controlling of the projection unit is based on the calculated at least one compensating variable for reducing a deviation of the light beam from the target position;
    wherein the at least one compensating variable additionally is calculated based on an earlier deviation in at least one earlier period, for the controlling of the deflecting unit,
    wherein the at least one compensating variable is calculated within a specifiable frequency control interval.

2. The method as recited in claim 1, wherein the at least one reference signal is provided in the form of a periodic bandwidth-limited signal.

3. The method as recited in claim 2, wherein the at least one reference signal is wave-shaped.

4. The method as recited in claim 1, wherein the calculation of the at least one compensating variable is done using a predictor.

5. The method as recited in claim 4, wherein the predictor is a Smith predictor.

6. The method as recited in claim 1, wherein a brightness of the deflected light beam is adapted, using an adaptation unit, as a function of the actual position.

7. The method as recited in claim 1, wherein the light beam is deflected by the deflecting unit at least two-dimensionally, by deflection with different speeds about at least two different axes.

8. The method as recited in claim 7, wherein the driving of the deflecting unit takes place via two reference signals, the two reference signals having different frequencies, and a deflection via the deflecting unit taking place in such a way that using a first of the two reference signals a deflection takes place about one of the two different axes, and using the second of the two reference signals, a deflection takes place about a second of the two different axes.

9. A method for operating a MEMS system having at least one projection unit configured to provide an image via at least one light beam, and a deflection unit configured to at least two-dimensionally deflect the at least one light beam, the method comprising the following steps:
    driving the deflecting unit using at least one reference signal, so that the deflecting unit periodically deflects the at least one light beam at least two-dimensionally;
    measuring at least one controlled variable of the deflecting unit that corresponds to an actual position of the deflected light beam;
    ascertaining a current deviation of the at least one controlled variable from a target variable that corresponds to a target position of the light beam;
    calculating at least one compensating variable based on the ascertained deviation; and
    controlling the deflecting unit with regard to the deflection and/or controlling the projection unit with regard to the image provision, wherein the controlling of the deflecting unit and/or the controlling of the projection unit is based on the calculated at least one compensating variable for reducing a deviation of the light beam from the target position;
    wherein the at least one compensating variable additionally is calculated based on an earlier deviation in at least one earlier period, for the controlling of the deflecting unit,
    wherein the at least one compensating variable is calculated within a specifiable frequency control interval, and the at least one reference signal is provided from at least one fundamental harmonic of a sawtooth signal, the at least one fundamental harmonic being provided within the frequency control interval.

10. A MEMS system, comprising:
    a projection unit configured to provide an image via at least one light beam;
    a deflecting unit configured to periodically deflect a light beam incident on the deflecting unit about two axes, based on at least one reference signal;
    a measuring unit configured to measure at least one controlled variable of the deflecting unit that corresponds to an actual position of the deflected light beam;
    a deviation measuring unit configured to ascertain a current deviation of the at least one controlled variable from a target variable that corresponds to a target position of the light beam;
    a predictor unit configured to calculate at least one compensating variable based on the ascertained deviation; and
    a controlling unit configured to control the deflecting unit with regard to the deflection and/or to control the projection device with regard to the image provision, based on the calculated at least one compensating variable for reducing a deviation of the light beam from the target position, in which, for the controlling of the deflecting unit, the at least one compensating variable is additionally calculated by the predictor unit based on an earlier deviation in at least one earlier period,
    wherein the at least one compensating variable is calculated within a specifiable frequency control interval.

11. The MEMS system as recited in claim 10, wherein the deflecting unit includes a MEMS mirror that is movable about at least two axes or at least two MEMS mirrors each movable about a respective axis, the at least two axes having different orientations.

12. The MEMS system as recited in claim 10, wherein the controlling unit includes an integrator and an anti-windup unit.

13. The MEMS system as recited in claim 10, wherein the predictor unit is configured to carry out the calculation based on a Smith predictor.

14. The MEMS system as recited in claim 10, wherein the controlling unit includes a closed linear control loop for controlling at least one of the axes of the deflecting unit.

* * * * *